(12) United States Patent
Bordenyuk

(10) Patent No.: US 8,390,926 B2
(45) Date of Patent: Mar. 5, 2013

(54) HIGH SPEED ACQUISITION VISION SYSTEM AND METHOD FOR SELECTIVELY VIEWING OBJECT FEATURES

(75) Inventor: Andrey Bordenyuk, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 436 days.

(21) Appl. No.: 12/855,647

(22) Filed: Aug. 12, 2010

(65) Prior Publication Data

US 2012/0038977 A1    Feb. 16, 2012

(51) Int. Cl.
*G02B 21/36* (2006.01)
*G01J 3/46* (2006.01)
(52) U.S. Cl. .................... 359/423; 359/385
(58) Field of Classification Search .............. 359/368, 359/385, 387, 389, 423
See application file for complete search history.

(56) References Cited

U.S. PATENT DOCUMENTS

| | | | |
|---|---|---|---|
| 5,604,344 A | 2/1997 | Finarov | |
| 5,886,813 A | 3/1999 | Nagasawa | |
| 7,120,309 B2 * | 10/2006 | Garcia | 382/275 |
| 7,133,132 B2 * | 11/2006 | Bustamante et al. | 356/338 |
| 7,542,203 B2 * | 6/2009 | Vodyanoy et al. | 359/387 |
| 7,700,903 B2 | 4/2010 | Weiss et al. | |
| 7,800,750 B2 * | 9/2010 | Bustamante et al. | 356/244 |
| 7,990,611 B2 * | 8/2011 | Betzig | 359/385 |
| 8,149,504 B2 * | 4/2012 | Kenny et al. | 359/389 |
| 2003/0058454 A1 | 3/2003 | Scheiner | |
| 2005/0117210 A1 * | 6/2005 | Ott | 359/388 |
| 2005/0237605 A1 * | 10/2005 | Vodyanoy et al. | 359/385 |
| 2009/0153956 A1 * | 6/2009 | Kusaka | 359/385 |
| 2009/0225408 A1 * | 9/2009 | Brehm et al. | 359/385 |

OTHER PUBLICATIONS

PCT International Search Report and the Written Opinion mailed Mar. 12, 2012, in related International Application No. PCT/US2011/044690.

* cited by examiner

*Primary Examiner* — Mark Consilvio
(74) *Attorney, Agent, or Firm* — TransPacific Law Group; Pavel Pogodin

(57) ABSTRACT

System and method for selectively viewing features of objects, including features hidden under non-transparent materials. The system includes: illuminating light source producing illuminating light having controlled angular spectrum; homogenizing optics for spatial intensity modulation of illumination light; dephasing optics to reduce or suppress interference pattern in image due to the coherence of illumination light; infinity corrected objective directing the illuminating light on the object and collecting light from the object; illumination optical path delivering the illuminating light from the illuminating light source to infinity-corrected objective; relay optics for introducing necessary tilt angle for rays of the illuminating light entering the infinity corrected objective; adjustable iris vignetting free aperture of optical fiber; apodizing element within relay optics for spatial modulation of illumination intensity; image sensor for creating image of object; and imaging optical path for delivering light from object to image sensor, which includes tube lens, removable block and adjustable iris.

31 Claims, 9 Drawing Sheets

HIGH SPEED ACQUISITION VISION SYSTEM AND METHOD FOR SELECTIVELY VIEWING OBJECT FEATURES

BACKGROUND OF THE INVENTION

1. Field of the Invention

The present invention generally relates to systems and methods for optical imaging and, more specifically, to providing fast (non-scanning) optical microscopy method and apparatus for selectively viewing various object features, including features buried under non-transparent material.

2. Description of the Related Art

Viewing of object features buried under "nontransparent materials" represents a serious technical challenge, especially when the optical vision system must be capable of generating real time live images of the object and the object features do not transmit light. Scanning is not an acceptable solution in such vision systems and back light illumination cannot be used because the object features themselves do not transmit backlight. Moreover, the use of an illuminating light with a wavelength located within the material transparency window may sometimes not be practical due to cost considerations, especially if the material transparency window is outside of the wavelength range of visible light. As would be appreciated by persons of skill in the art, using ultraviolet or infrared sources of light for illumination of the nontransparent object together with imaging sensors having sensitivity in the corresponding wavelength ranges considerably increases the overall cost of the optical inspection system and, therefore, is undesirable. In addition, the use of infrared illumination light sources is disfavored because the optical resolution of the imaging system decreases with the increase of the wavelength of the illuminating light.

In other applications it is desirable to have a vision system that would emphasize certain features of the object and de-emphasize others. For example, in many applications the surface texture of the object is not as important as features appearing on the object's surface.

SUMMARY OF THE INVENTION

The described methodology is directed to methods and systems that substantially obviate one or more of the above and other problems associated with conventional techniques for selectively viewing object features, including object features buried under non-transparent material.

In accordance with one aspect of the described methodology, there is provided an optical apparatus for creating an image of an object having non-transparent material. The described apparatus includes an illuminating light source producing an illuminating light having a controlled angular spectrum; an infinity corrected objective directing the illuminating light on the object and collecting light from the object; an illumination optical path delivering the illuminating light from the illuminating light source to the infinity-corrected objective; a relay optics disposed within the illumination optical path for introducing a predetermined tilt angle for rays of the illuminating light entering the infinity corrected objective; an image sensor for creating the image of the object; and an imaging optical path for delivering the collected light from the infinity-corrected objective to the image sensor. In the described optical apparatus, the illuminating light source, the infinity corrected objective and the relay optics are arranged to at least partially prevent stray light rays, rays, scattered by the surface or interface of the non-transparent material and light rays, perturbed by inhomogeneities of the non-transparent material, from entering the imaging optical path.

In accordance with another aspect of the described methodology, there is provided an optical apparatus for creating an image of an object including an object feature. The described apparatus includes an illuminating light source having an emitting aperture and producing an illuminating light having a controlled angular spectrum; an infinity corrected objective directing the illuminating light on the object and collecting light from the object; an illumination optical path delivering the illuminating light from the illuminating light source to the infinity-corrected objective; a relay optics disposed within the illumination optical path for introducing a predetermined tilt angle for rays of the illuminating light entering the infinity corrected objective; an image sensor for creating the image of the object; and an imaging optical path for delivering the collected light from the infinity-corrected objective to the image sensor. In the described apparatus, the emitting aperture of the illuminating light source is configured to completely fill the entrance pupil of the infinity corrected objective and the relay optics is configured to provide focusing of the illuminating light on the surface of the object or building an image of the illuminating light source at an object plane.

In accordance with yet another aspect of the described methodology, there is provided an optical apparatus for creating an image of an object including an object feature. The described apparatus includes an illuminating light source having an emitting aperture and producing an illuminating light having a controlled angular spectrum; an infinity corrected objective directing the illuminating light on the object and collecting light from the object; an illumination optical path delivering the illuminating light from the illuminating light source to the infinity-corrected objective; a relay optics disposed within the illumination optical path for introducing a predetermined tilt angle for rays of the illuminating light entering the infinity corrected objective; an image sensor for creating the image of the object; and an imaging optical path for delivering the collected light from the infinity-corrected objective to the image sensor. In the described apparatus, the emitting aperture of the illuminating light source is substantially reduced and the relay optics is configured to provide a strongly divergent or a strongly convergent illuminating light incident on the object.

In accordance with a further aspect of the described methodology, there is provided a method for creating an image of an object including non-transparent material. The inventive method involves producing, using an illuminating light source, an illuminating light having a controlled angular spectrum; directing, using an infinity corrected objective, the illuminating light on the object and collecting light from the object; delivering, using an illumination optical path, the illuminating light from the illuminating light source to the infinity-corrected objective; introducing, using a relay optics disposed within the illumination optical path, a predetermined tilt angle for rays of the illuminating light entering the infinity corrected objective; creating, using an image sensor, the image of the object; and delivering, using an imaging optical path, the collected light from the infinity-corrected objective to the image sensor. In the inventive method, the illuminating light source, the infinity corrected objective and the relay optics are used to at least partially prevent stray light rays, rays, scattered by the surface or interface of the non-transparent material and light rays, perturbed by inhomogeneities of the non-transparent material, from entering the imaging optical path.

In accordance with yet further aspect of the described methodology, there is provided a method for creating an image of an object including an object feature. The inventive method involves producing, using an illuminating light source having an emitting aperture, an illuminating light having a controlled angular spectrum; directing, using an infinity corrected objective, the illuminating light on the object and collecting light from the object; delivering, using an illumination optical path, the illuminating light from the illuminating light source to the infinity-corrected objective; introducing, using a relay optics disposed within the illumination optical path, a predetermined tilt angle for rays of the illuminating light entering the infinity corrected objective; creating, using an image sensor, the image of the object; and delivering, using an imaging optical path, the collected light from the infinity-corrected objective to the image sensor. In the inventive method, the emitting aperture of the illuminating light source is used to completely fill the entrance pupil of the infinity corrected objective and the relay optics is used to provide focusing of the illuminating light on the surface of the object or building an image of the illuminating light source at an object plane.

In accordance with yet further aspect of the described methodology, there is provided a method for creating an image of an object including an object feature. The inventive method involves producing, using an illuminating light source having an emitting aperture, an illuminating light having a controlled angular spectrum; directing, using an infinity corrected objective, the illuminating light on the object and collecting light from the object; delivering, using an illumination optical path, the illuminating light from the illuminating light source to the infinity-corrected objective; introducing, using a relay optics disposed within the illumination optical path, a predetermined tilt angle for rays of the illuminating light entering the infinity corrected objective; creating, using an image sensor, the image of the object; and delivering, using an imaging optical path, the collected light from the infinity-corrected objective to the image sensor. In the inventive method, the emitting aperture of the illuminating light source is substantially reduced and the relay optics is configured to provide a strongly divergent or a strongly convergent illuminating light incident on the object.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the described technique. Specifically.

DETAILED DESCRIPTION

Figure 1:
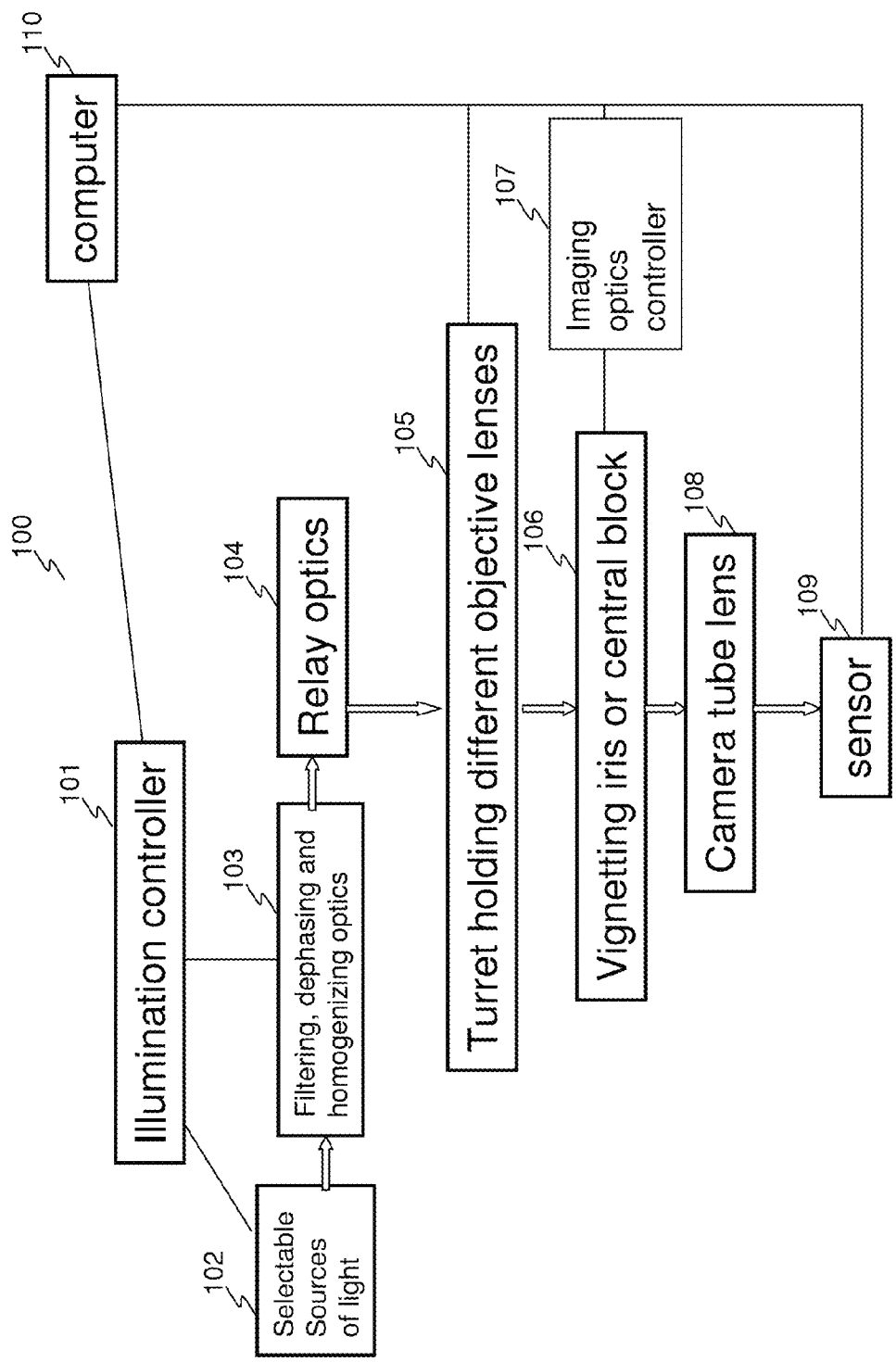
FIG. 1 illustrates a principle concept of an exemplary embodiment of a novel optical image acquisition system.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient details to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

One or more embodiments of the present invention provide a fast optical (non-scanning) microscopy method and apparatus for selectively viewing object features, including object features buried under non-transparent material. In one or more embodiments of the invention, the resolution of the described optical system is limited only by diffraction effects. One or more embodiments of the present invention utilizes an illumination light source having a wavelength that can be efficiently detected using a regular (i.e. not infra-red (IR) or ultraviolet (UV)) CCD camera or other low cost image sensing and recording device, such as a photography plate. In one or more embodiments of the present invention, the wavelength of the object illuminating light is set as short as possible in order to maximize the resolution capability of the system.

As used herein:

1) "Nontransparent material" refers to a material for which the reflectance of light from its surface, or the interface accepting incident light, is comparable to or greater than product of a) transmittance of a path equal to 2 thicknesses of the material, and b) reflectance from the buried interface. The nontransparent materials include semi-opaque and semi-transparent materials.

2) "Source with controlled angular spectrum" refers to a source of light having each point of the light emitting surface thereof emitting light only in certain angular direction or within a small solid angle around this angular direction. The specific angular direction and the distribution width of the solid angle of light emission depend on the characteristics of the specific optics used for particular design of the optical inspection apparatus. The aforesaid source with controlled angular spectrum may be a laser, a laser diode or any incoherent source having its output light appropriately filtered to ensure that each point of the source emits light only in certain angular direction or within small solid angle around that certain angular direction.

Various embodiments of the present invention provide a mechanism, as will be explained in details below, designed to facilitate the delivery of the illumination light to the object in such a way as to obtain high image contrast, which is sufficient for detection of features buried under non-transparent material with the resolution of the image limited only by diffraction effects.

As it is well known to persons of skill in the art, visibility of image is characterized by image contrast. Other conditions being the same, the visibility of object features scales with increasing contrast. When feature sizes are larger than the diffraction limit of the vision system, and vision system has a Modulation Transfer Function close to unity, contrast is determined by the ratio of illumination intensity collected from object feature to be resolved to the background illumination measured within the image plane.

Therefore, in order to increase the contrast, it is desirable to reduce the intensity of the background illumination. There are several contributors to the background illumination intensity, which can be addressed. Foremost among them are the light reflected and/or scattered from the surface or interface of the non-transparent material and so called stray light which is a result of imperfect illumination beam delivery.

As would be appreciated by persons of skill in the art, non-transparent material may contain spatial inhomogeneities, which act to perturb rays originating from the object feature to be resolved by the imaging system. Such perturbation of ray propagation, which has scattering nature, causes uncontrolled image blur, displacement of image position from true location and formation of fake features, which complicate feature recognition and reduce resolution, sometimes making image features unresolvable. Reconstruction of images perturbed in the described manner requires an application of advanced machine vision algorithms, which is resource and time consuming, and, for this reason, impractical for high-speed image acquisition applications requiring real time image processing.

Various embodiments of the present invention provide systems and methods for increasing the contrast of the produced optical image by reducing amount of stray light as well as light reflected and scattered from the surface or the interface of the non-transparent material, which penetrates into the vision (image acquisition) system as well as the light perturbed by inhomogeneities of the non-transparent material. The following is a detailed description of exemplary embodiments of the present invention.

FIG. 1 illustrates a principle concept of an exemplary embodiment of a novel optical image acquisition system 100. As illustrated in FIG. 1, the described optical image acquisition system incorporates multiple selectable sources of light 102 and filtering, dephasing and homogenizing optics 103, which are controlled by the illumination controller 101. The conditioned light beam produced by the aforesaid optical components passes relay optics 104 provided for spatial intensity modulation and introducing necessary tilt angle for rays of the illuminating light entering the infinity corrected objective lens mounted on the turret 105 before impacting the object and being collected by the same objective lens. The light directly reflected or scattered by the object is filtered out by the vignetting iris or central block 106, which is controlled by the imaging optics controller 107. The output light is collected by the camera tube lens 108 and the image sensor 109. The computer system 110 performs overall control functions with respect to the optical image acquisition system 100 and also may perform the analysis of the image acquired by the image sensor 109.

Because backside light illumination is not suitable for imaging of non-transparent features, various embodiments of the present invention utilize a coaxial front-side illumination light source in combination with infinity corrected objective optics. As it is well known to persons of ordinary skill in the art, the infinity corrected optics is configured to create an image of the object, which is positioned in the object plane, at infinity.

Figure 2:
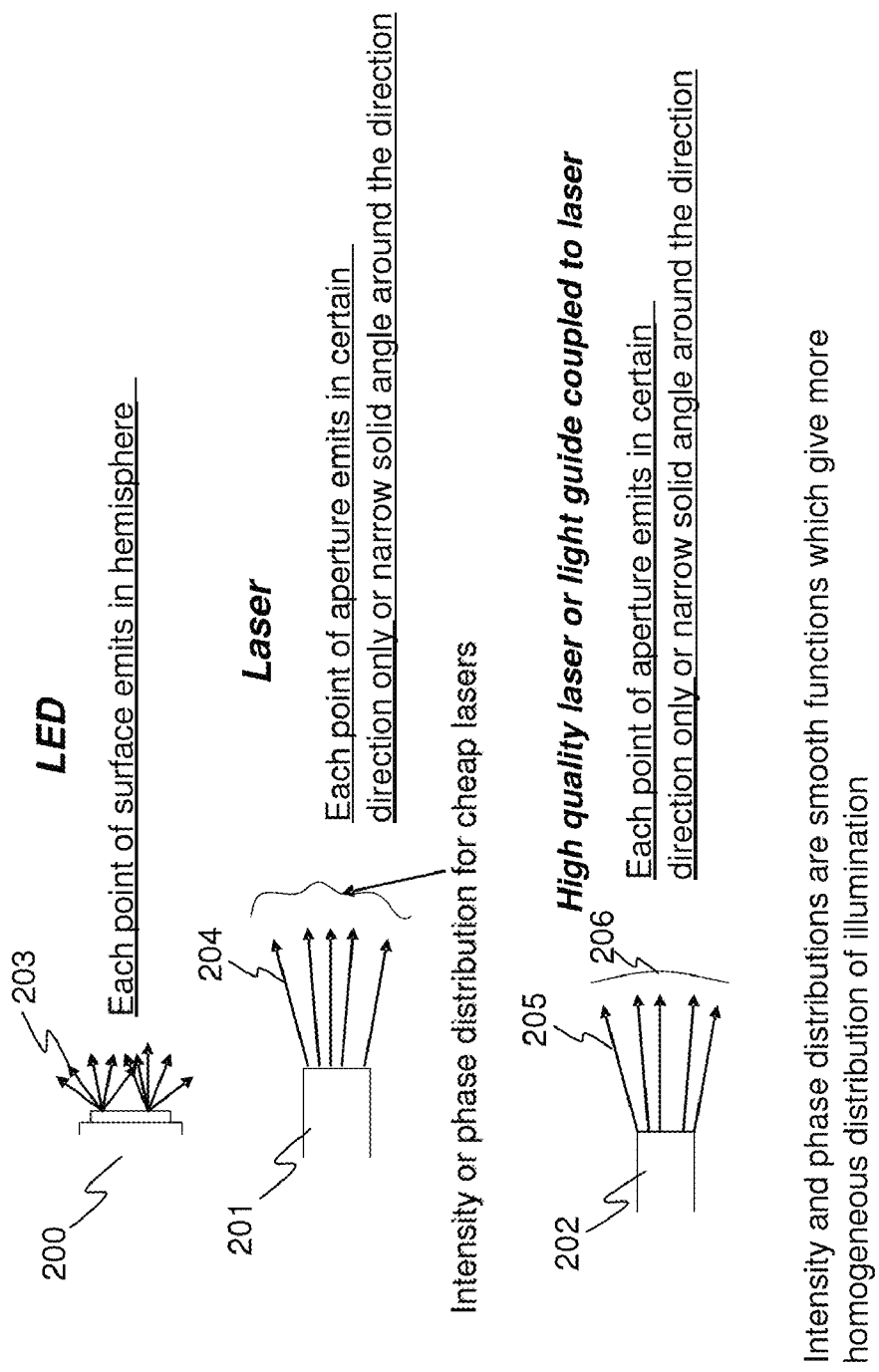
FIG. 2 illustrates exemplary properties of certain light sources.

The aforesaid stray light entering optical imaging systems is typically a result of imperfect illumination beam delivery system. FIG. 2 illustrates certain light emission properties of several exemplary types of light sources. Specifically, it can be seen from FIG. 2 that each point of the light emitting surface of an LED 200 has a hemispherical emission light pattern 203. On the other hand, each specific emission surface point of lasers 201 and 202 emits light 204 and 205 in a specific direction only or within a narrow solid angle around this direction. The high quality leaser 202 differs from the low quality one 201 in that the intensity and phase distributions of the light emitted by the high quality laser are smooth functions of the angle 206, which ensures a more homogeneous distribution of light illumination. Because of the uniformity of the illumination of the object by the high quality laser 202, the use of the high quality laser 202 results in higher quality images compared with the laser 201. It should be noted that the use of the low quality laser for illumination of objects usually requires additional homogenization of the illuminating light beam. One exemplary device that facilitates the homogenization of the light beam is a rotating disk optical assembly well known to persons of ordinary skill in the art.

Figure 3:
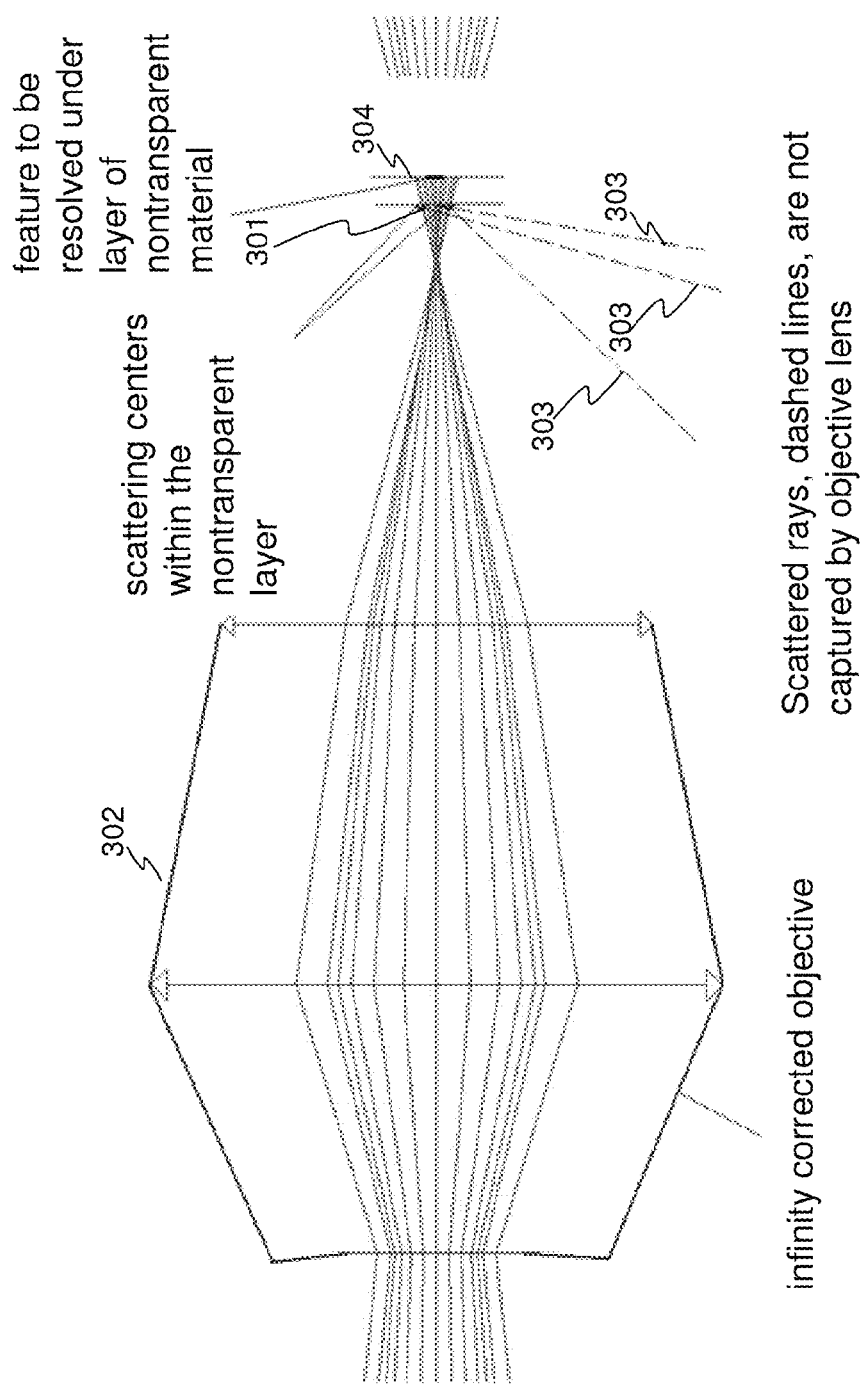
FIG. 3 illustrates an exemplary embodiment of an described approach to reduce amount of light, scattered at surface or interface of non-transparent material, and captured by imaging system.

FIG. 3 illustrates an exemplary embodiment of described methodology for eliminating light scattered by micro roughness of the surface or interface 301 of the non-transparent material. In one or more embodiments of the invention, this is achieved by application of a light source with controlled angular spectrum and specially designed system for delivery of illumination light rays to the infinity corrected objective 302, which directs the light onto the surface or interface of the non-transparent material in a divergent manner. As a result of the application of the described illumination technique, significant fraction of light rays 303 scattered at the surface or interface leave the imaging system and do not contribute to the image background. The reduced image background, in turn, operates to improve the contrast of the feature 304 in the resulting image.

Figure 4:
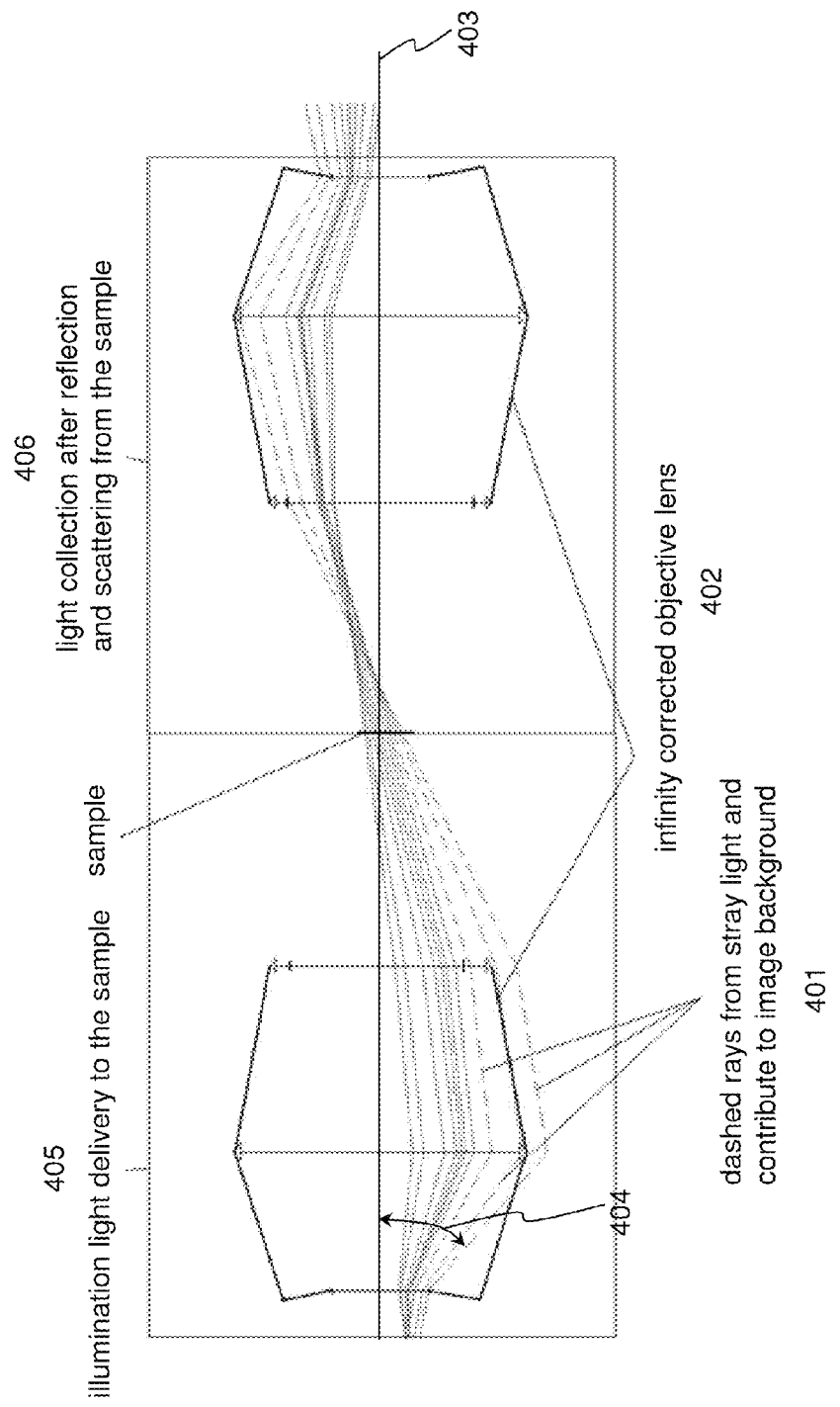
FIG. 4 illustrates stray light from regular sources or incorrect beam delivery.

As would be appreciated by persons of skill in the art, with reference to FIG. 4, illustrating conventional light delivery system 405 and light collection system 406, the stray light 401 can occur, for example, due to the multiple reflection and scattering of oblique illumination rays, usually produced by incoherent sources such as LEDs or incandescent lamps. The aforesaid oblique rays may also result from inaccurate coupling of the light source to the optical system. Such oblique rays have tilt angle 404 with respect to optical axis 403 within the exit pupil of objective 402 greater than the tilt of the marginal ray, which determines maximum size of Field of View (FOV) for given objective, as illustrated in FIG. 4. In accordance with one or more embodiments of the invention, in order to reduce or eliminate the amount of such stray light, the illumination system is designed to efficiently control divergence and angular spectrum of the illumination beam within its cross-section. This is achieved by means of a relay optics, which introduces necessary tilt angle for rays of the illuminating light entering the infinity corrected objective.

Figure 5:
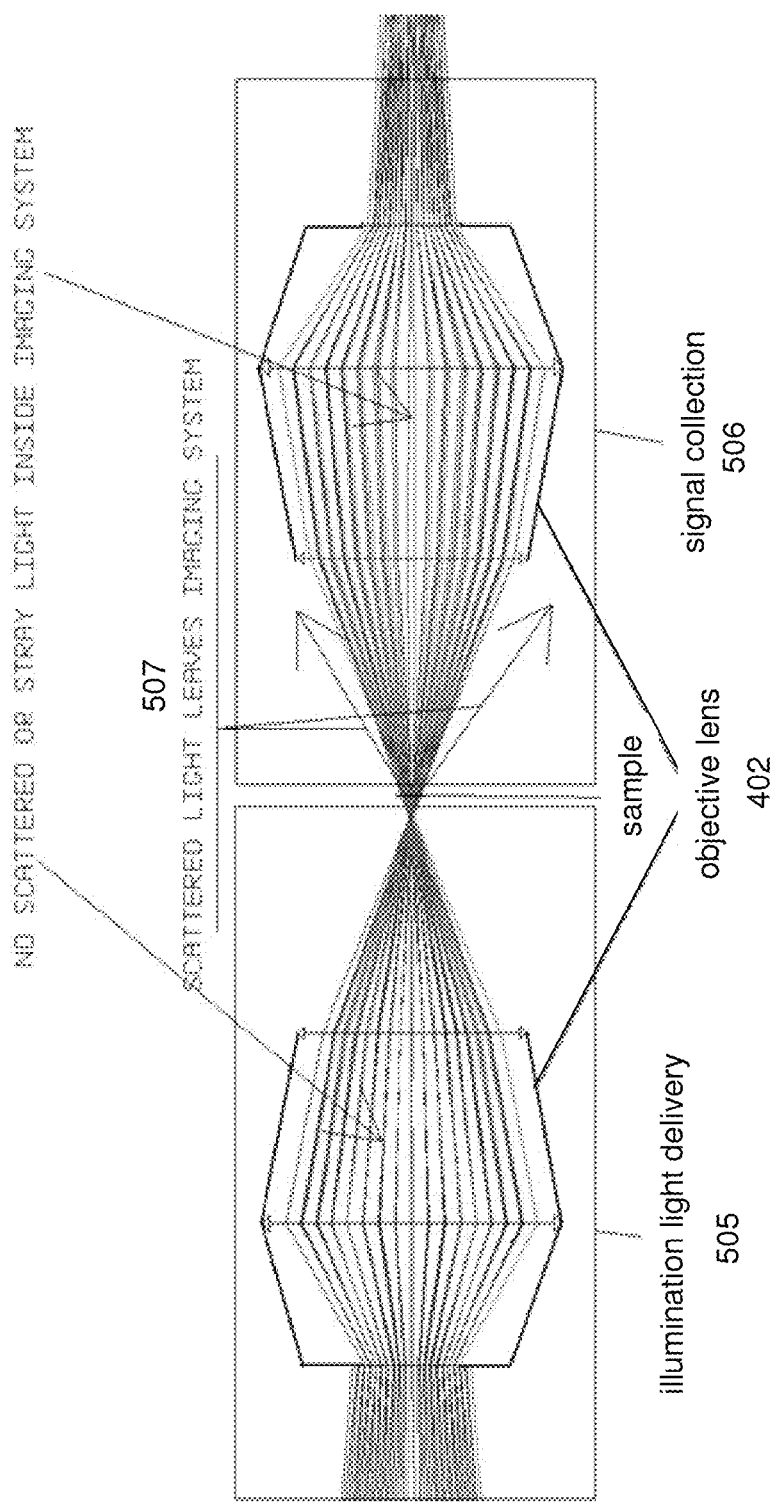
FIG. 5 illustrates correct beam delivery due to implementation of sources with controlled angular spectrum in accordance with an embodiment of the described system.

FIG. 5 illustrates an exemplary application of light sources with controlled angular spectrum to reduce or eliminate stray light, which contributes to background lighting within the optics of imaging system. As can be clearly seen from this figure, due to the controlled nature of the angular spectrum of the illuminating light entering the illumination light delivery system 505, there is no stray light in the signal collection system 506. In addition, the light rays 507 scattered by inhomogeneities of the non-transparent layer do not penetrate the light collection system 506. This results in reduced image background and increased contrast of the generated image of the object features.

In one or more embodiments of the invention, the controlled angular spectrum of the illuminating light is the feature, which allows reducing the amount of stray and scattered light infiltrating the imaging system 506. In order to increase functional capabilities of the system, while maintaining its low cost low and/or small size, in one or more embodiments of the invention, a semiconductor laser (laser diode) or a solid state laser may be used as the illumination light source with the controlled angular spectrum for high speed image acquisition. In one or more embodiments of the inventive system, the same laser may perform another function, such as material processing, which may involve correction of certain defects detected in an imaging mode. It should be noted that in a system with a dual-use laser, an appropriate light attenuation component may be provided to ensure proper light pulse energy balance in the image acquisition and material processing modes. In another embodiment, a light emitting diode (LED) coupled to an optical fiber having a controllable iris in order to vignette emitting area and make it point-wise source is used for low speed image acquisition. In other exemplary embodiments, any light source with a controlled angular spectrum can be utilized for object illumination. In order to smooth out the variation of divergence angle (perform angular filtering) and the intensity distribution within the light beam cross-section, in one or more embodiments of the invention, a fiber or a light guide coupled to the light source is utilized. In other exemplary embodiments, a required beam quality is obtained with the use of a high quality laser or a beam shaper or by performing an angular filtering of light produced by a light source with regular properties. The emission properties of the aforesaid high quality laser are illustrated in FIG. 2 and described above.

Figure 6:
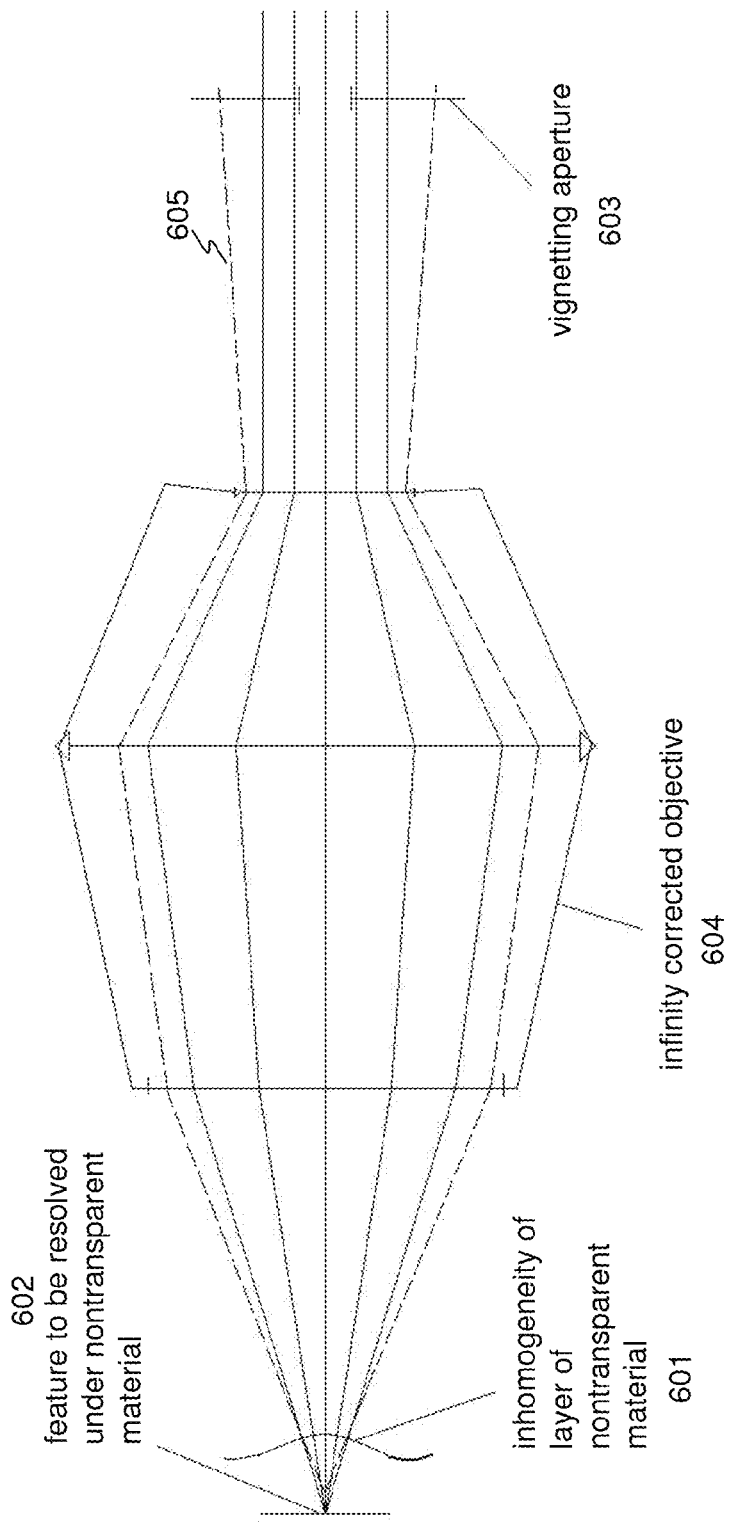
FIG. 6 illustrates rays perturbed by inhomogeneities of non-transparent material and captured by an embodiment of the described imaging system.

FIG. 6 illustrates an exemplary embodiment of described methodology for eliminating rays, which are perturbed by inhomogeneities 601 of non-transparent material. Such rays may cause image blur or perturbation of a portion of the image of the feature 602 in terms of shape or location, axial or transverse, as well as formation of fake images. This is achieved by setting a controlled vignetting iris 603 between the infinity corrected objective lens 604 and tube lens (not shown) coupled to the objective lens. Such an iris plays a role of a new aperture stop for the image collection system, which artificially narrows the numerical aperture of the imaging system and makes the objective work in a non-telecentric mode. Even though this reduces the resolution of the optical system, it also results in the reduction or complete elimination of the amount of perturbed image forming rays 605, which contaminate resulting images with artifacts and reduce contrast. The potential negative effect of the numerical aperture narrowing can be reduced by building an optical system, which is oversampled under normal (no iris) conditions.

Figure 7:
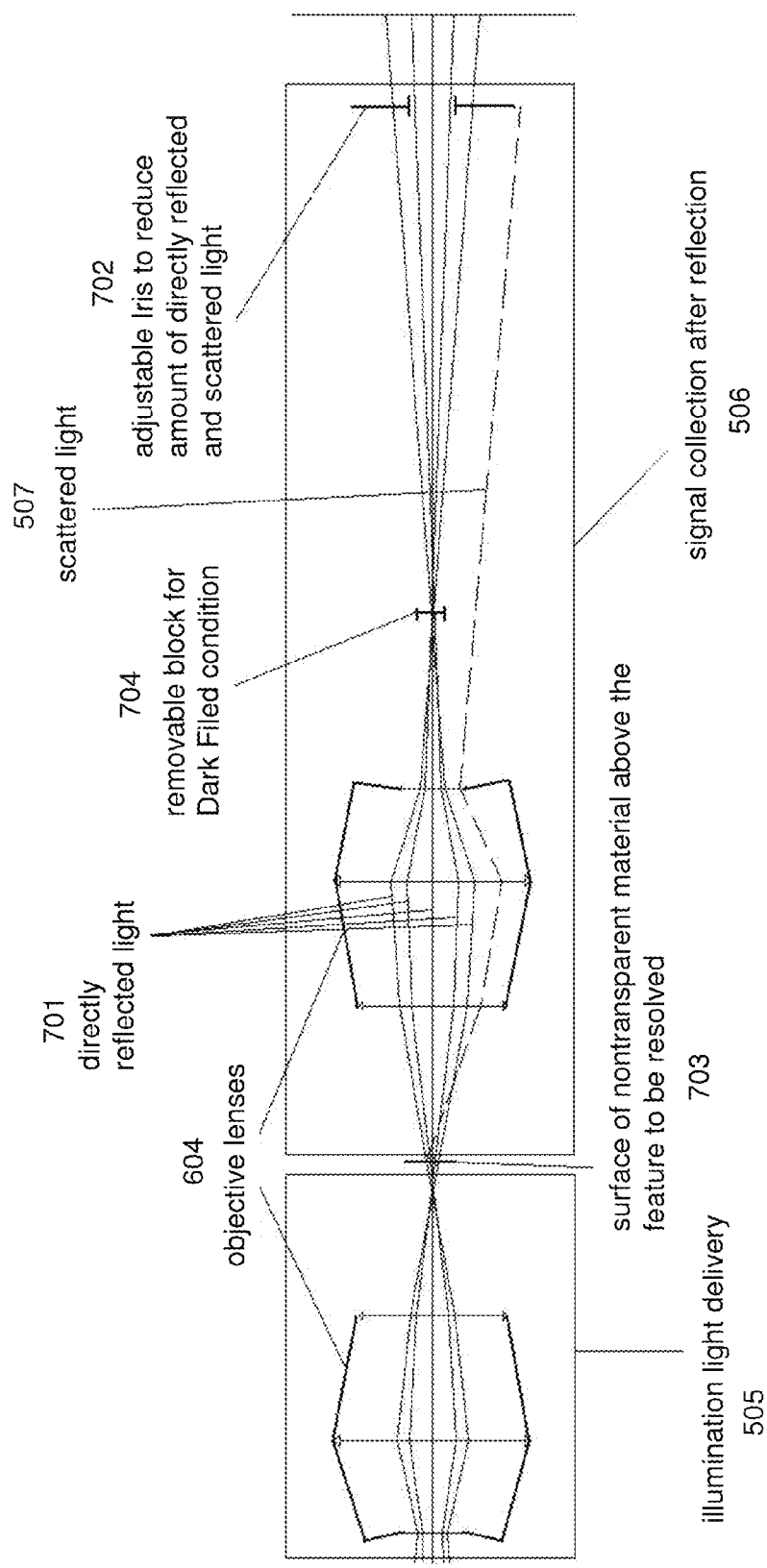
FIGS. 7 and 8 illustrate an exemplary embodiment of described technique for eliminating or reducing light directly reflected from surface or interface of non-transparent material, stray light and light scattered or perturbed by inhomogeneities of non-transparent material by using source with controlled angular spectrum.
Figure 8:
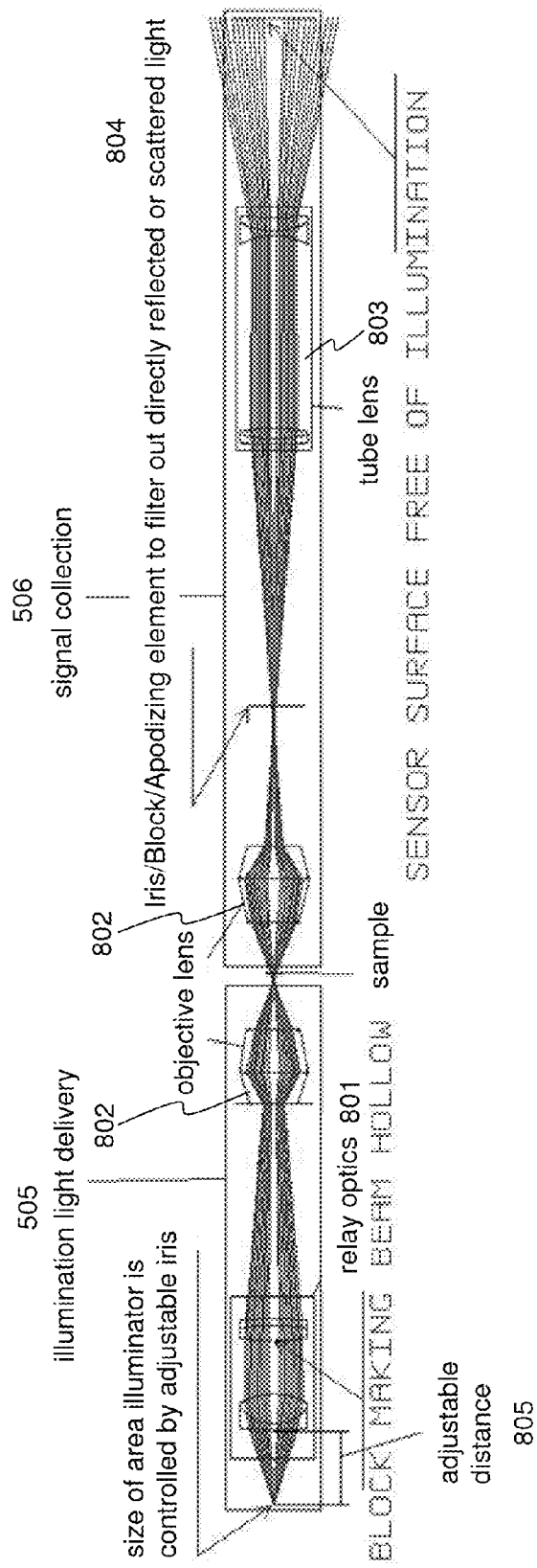

FIGS. 7 and 8 illustrate an exemplary embodiment of the described methodology for eliminating light, which is reflected directly into the objective by the object, by means of a light source with a controlled angular spectrum. Specifically, in one or more embodiments of the invention, as illustrated in FIG. 8, the output of the light guide, fiber or source of light with controlled angular spectrum is used in combination with "relay optics" 801, working in junction with infinity corrected objective. In one embodiment, the "relay optics" 801 is utilized to introduce necessary tilt angle for rays entering into the infinity corrected objective that allows directly reflected rays to be focused between the objective lens 802 and tube lens 803 and prevents directly reflected rays from forming image within the sensor plane. Under such conditions the directly reflected light can be completely or partially filtered out by implementing a block or apodizing element 804 in place of focus of the objective lens 802, as shown on FIG. 8. In an alternative embodiment, the directly reflected light 701 can be partially eliminated by deploying the vignetting iris 702 in a manner illustrated in FIG. 7.

In one or more embodiments of the invention, the angular spectrum of the illumination beam entering into the exit pupil of the infinity corrected objective is controlled in order to reduce the amount of light directly reflected from the surface or interface of non-transparent material and returned into the vision system. To achieve this goal, one or more embodiments of the invention utilize a combination of 1) beam divergence, which is a property of a light source with controlled angular spectrum or a particular fiber or a light guide coupled to a light source; and 2) the power of the relay optics.

In order to further control the angular spectrum of the illumination light beam, one or more embodiments of the invention additionally comprise means for performing beam apodization (spatial modulation of intensity across the beam) before the beam enters into the infinity corrected objective as shown on FIG. 8. This is done in order to remove rays having a small tilt angle with respect to the optical axis in the object space from the illumination beam, which cannot be filtered out by the iris set 804 in front of tube lens 803. Furthermore, in the same or other embodiments of the invention, an enhancement of contrast in the axial region is obtained by apodizing and vignetting the beam before entering the tube lens 803 of the imaging system.

Because various embodiments of the invention utilize a coherent source of light for illumination of the non-transparent object, strong interference patterns can appear in the resulting image, which can degrade contrast. These interference patterns in the acquired image due to the coherent nature of the illumination light are commonly called "speckle patterns". Such patterns degrade image quality in terms of resolving power, contrast and fake features in the image, when other conditions are the same. Processing of such images requires significant computational resources and time consuming algorithms and usually cannot be done in real time. To eliminate or reduce the "speckle pattern" and enable simple machine vision algorithms to process image in real time the efficient decoherence of laser output must be accomplished.

Figure 9:
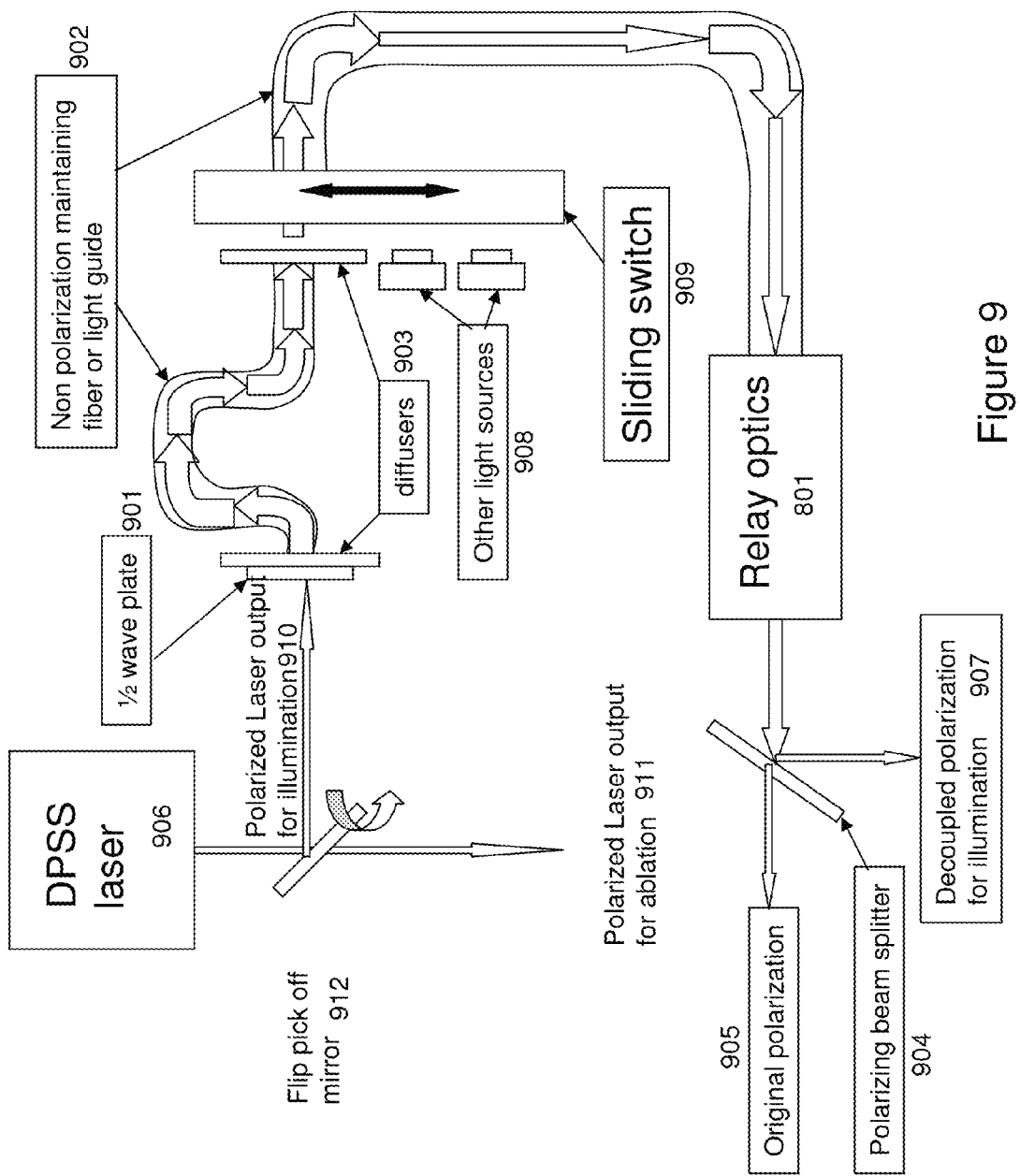
FIG. 9 demonstrates an exemplary embodiment of a described multisource illuminator and dephasing system and method for reducing coherence of laser sources and the related "speckle pattern" in the image.

FIG. 9 demonstrates an exemplary embodiment of a multisource illuminator and dephasing system and method for reducing coherence of laser sources and the related "speckle pattern" in the image. In order to eliminate the aforesaid interference effects in the image, one or more embodiments of the invention use a dephasing optics, which consist of a ½ wave plate 901, a non-polarization maintaining fiber or a light guide 902 coupled to light diffusers 903 and a polarizing beam splitter 904. Laser light generated by a laser 906 and propagating along an optical path 910 through diffusers 903 and non-polarization maintaining fiber or light guide 902 experiences depolarization. Factors contributing to the described depolarization process are statistically independent and, for this reason, the fraction of the beam with modified polarization state has very low coherence. In one implementation, the laser 906 can be either diode-pumped solid-state laser (DPSS), a semiconductor laser or a gas laser. However, as would be appreciated by those of skill in the art, the aforesaid types of lasers are provided herein as examples only and the described concept is not limited by any specific laser types or characteristics. Thus, any suitable now available or later developed laser could be used in the embodiments of the present invention as the illumination light source. It should be noted that in the configuration shown in FIG. 9, the laser 906 may be utilized for material processing (ablation) in the manner described hereinabove. To this end, the configuration shown in FIG. 9 is provided with a flip pick off mirror 912 designed to facilitate switching between the two operating modes of the laser 906 by selectively directing the light output of the laser along the corresponding two optical paths 910 and 911.

The ½ wave plate 901 allows adjusting directions of the original polarization and decoupled polarization with respect to the reflected/transmitted polarization of the polarizing beam splitter 904. The polarizing beam splitter 904 allows reflecting either original polarization direction 905, having highest intensity, or decoupled polarization direction 907, having lowest intensity, or their combination. The decoupled polarization 907 produced by the polarizing beam splitter 904 is used for illumination of the object.

The illumination system is configured to enable easy use of several different coherent and incoherent light sources 908 of different wavelength according to the choice of the operator using switch 909.

In one or more embodiments of the invention illumination light generated by various sources is delivered to the relay optics 801 through the same optical fiber or light guide 902. In order to efficiently control angular distribution of the illumination light reaching the relay optics within a predetermined solid angle, an adjustable iris vignetting output of fiber delivering light to relay optics is used. Distance 805 (see FIG. 8) between the fiber output and the relay optics is also an adjustable parameter. Adjustability of these two parameters, diameter of the output aperture of the fiber delivering illumination light and the distance between the fiber output and the relay optics 805, allows filtering out undesirable illumination rays and operates to convert even incoherent sources into sources with controlled angular spectrum in order to fully capitalize on the advantages of the properties of the aforementioned sources.

To reduce the amount of light directly reflected by the surface or interface of the non-transparent material 703 (see FIG. 7) and having a small tilt angle with respect to the optical axis (which can not be eliminated by the iris 702 in front of the tube lens) a completely or partially opaque block 704 may be installed within the relay optics module. This block operates to reduce or remove rays having small tilt angle with respect to the optical axis from the illumination beam, which results in the illumination beam becoming hollow or apodized. This approach allows modulating the illumination intensity distribution within the object plane.

In one or more embodiments of the invention, the illumination light beam is coupled to the infinity corrected objective by placing a beam splitter between the infinity corrected objective and the tube lens of the viewing camera. One or more embodiments of the invention utilize an illumination light source having an illumination light wavelength that can be efficiently detected by a regular CCD or CMOS camera, sensitive within 400-1100 nm wavelength range. However, as would be appreciated by those of skill in the art, the described concept is not limited to the wavelength range provided herein. The use of CCD or CMOS devices, well known to persons of skill in the art and widely available commercially, for image acquisition reduces the costs of the detection system while simultaneously providing high pixel density. In this configuration, it is desirable to choose the shortest wavelength from the favorable candidates, in order to retain maximum optical resolution capability. Also in one or more embodiments of the invention, a narrow band source of illuminating light is provided, which allows using narrow spectral windows and improves contrast.

The above-described embodiments of the described vision system allow obtaining high quality images of object features buried under non-transparent material with diffraction limited resolution, which is determined by properties of the infinity corrected objective, tube lens, and vignetting/blocking components set between the objective and the tube lens.

As indicated earlier, in various embodiments, the source with controlled angular spectrum may be a laser, a laser diode (LED) or any incoherent light source, such as a candescent lamp, having its output light appropriately filtered to ensure that each point of the source emits light only in a specific angular direction or within a small solid angle around a specific angular direction. This angular direction and the distribution width of the aforesaid solid angle depend on the parameters of the optics used for a particular design of the imaging system. To ensure a uniform illumination of the object, the intensity of the beam produced by the illuminating light source may be conditioned using an angular beam intensity modulator, such as a diffuser and/or beam apodizing blocks. In one or more embodiments of the invention, the illuminating light source may operate in the visible light wavelength range of between 800 and 1200 nm.

In one or more embodiments of the invention a nanosecond output of diode pumped solid state laser 906 is used for a dual purpose, including material processing (see output 911 in FIG. 9) and illumination of field of view of the vision system. Such configuration provides for very fast image acquisition in the on-the-fly mode and permits implementation of electronic sensors with both types of shutters, including a rolling shutter and a global shutter. In both shutter configurations, the efficiency will be substantially similar because illumination pulse duration of the laser 906 is much shorter than the length of travel distance of the image sensor during acquisition of the image signal.

In one or more embodiments of the invention the illuminating light source is a monochromatic light source producing substantially monochromatic illuminating light. In the same or different embodiments, the optical apparatus further incorporates a color inspection subsystem including a white illuminating light source producing a white illuminating light. A switching module may be provided which operates to alternatively illuminate the object by monochromatic light and the white light. In one or more embodiments of the described concept, the optical apparatus incorporates an switch configured to alternatively couple the monochromatic illuminating light source and the white illuminating light source to the illumination path. As would be appreciated by those of skill in the art, in such system, both monochromatic and color images of the object may be obtained, which may result in improved detectability of certain object features.

In one or more embodiments of the invention, the tilt angle of the illumination rays introduced by the relay optics varies within a range of between 0 and 5 angular degrees. As would be appreciated by those of skill in the art, the aforesaid angular range is provided herein by way of an example only and the described concept is not limited to any specific tilt angle or range of tilt angles.

In one or more embodiments of the invention, the energy of the illumination light pulse varies within a range between 1 and 2 mJ. As would be appreciated by those of skill in the art, the aforesaid energy value is provided herein by way of an example only and the described concept is not limited to any specific light pulse energy or range of light pulse energies.

In one or more embodiments of the invention the solid angle characterizing the source with controlled angular spectrum varies within a range between 0 and 0.16 steradians. As would be appreciated by those of skill in the art, the aforesaid solid angle range is provided herein by way of an example only and the described concept is not limited to any specific solid angle characterizing the source with controlled angular spectrum or range of solid angles.

Inspection of micro circuitry with a repeating pattern such as an array of pixels for the purpose of detection and identification of defects requires the use of an optical system with high resolution because of a small size of the features to be resolved as well as a high acquisition rate of electronic detection system due to a large number of pixels to be inspected. Therefore, it is strongly preferred to execute the inspection process automatically using a machine vision technique. Because of a high image acquisition rate, which can reach in some embodiments 50-100 frames per second, and a large field of view, which can be, in some embodiments, as large as 600-800 micron, combined with required high resolution (typically 1-2 microns), preferably image sensors with high pixel numbers should be used. On the other hand, the used image analysis methods or machine vision techniques must be very simple in order to enable real time or almost real time processing of large volumes of data, so that the acquired image is processed and the required correction or decision is generated earlier or by the time the next event requiring such correction or decision occurs, such as the acquisition of the next image or a new task.

Circuitries which carry optically transparent or semitransparent features, such as an active ITO layer, or color filter layers on LCD panels may have technological textures which would appear as a large number of features to a machine vision system. Processing these features, which normally do not contain defects, provides a substantial load on the computing resources, which perform image analysis. However, in some applications, such as manual inspection, these features must be viewable by the imaging apparatus. Thus, there is a need to selectively filter out these features from the resulting object image using flexible and controllable hardware optical means.

One or more embodiments of the invention enable the operator of the optical imaging system to control parameters of illumination beam to cause certain object features to become substantially or completely invisible in the resulting image of the object. To enable this function, the emitting aperture of the source with controlled angular spectrum must be big enough to completely fill entrance pupil of the infinity corrected objective and the relay optics must be adjusted to provide focusing of the illumination light on the surface of the object. Under these conditions, each point of the object is being illuminated symmetrically with maximum tilt angle of illumination rays allowed by specific objective numerical aperture (NA). Object features having small variation of refraction index compared with the surrounding material and characterized by small height and shallow slopes will be invisible under the aforesaid illumination conditions. To achieve the aforesaid illumination configuration, the adjustable iris vignetting optical fiber must be opened and distance between the fiber and relay optics must be adjusted to achieve focusing of the illumination beam on the object or creation of an image of the illuminating source of light at the object plane for area sources.

One or more embodiments of the invention also enable one to emphasize the described object features, by shading them off and making them easily resolvable. This requires reducing the aforesaid emitting aperture and creating a strongly divergent or convergent beam incident on the object.

Thus, by controlling the characteristics of the illuminating light beam in the described manner, one is able to emphasize and de-emphasize certain object features in the resulting image of the object.

The design of the other optical components of the described system, including the relay optics, the infinity corrected objective, the beam splitter and the tube lenses is well known to persons of ordinary skill in the art and such components are widely available commercially.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in the system for viewing features buried under non-transparent material with diffraction-limited resolution. It is intended that the specification and examples be considered as exemplary only, with a true scope and spirit of the invention being indicated by the following claims.

What is claimed is:

1. An optical apparatus for creating an image of an object comprising non-transparent material, the apparatus comprising:
   a. an illuminating light source producing an illuminating light having a controlled angular spectrum;
   b. an infinity corrected objective directing the illuminating light on the object and collecting light from the object;
   c. an illumination optical path delivering the illuminating light from the illuminating light source to the infinity-corrected objective;
   d. a relay optics disposed within the illumination optical path for introducing a predetermined tilt angle for rays of the illuminating light entering the infinity corrected objective;
   e. an image sensor for creating the image of the object; and
   f. an imaging optical path for delivering the collected light from the infinity-corrected objective to the image sensor,
   wherein the illuminating light source, the infinity corrected objective and the relay optics are arranged to at least partially prevent stray light rays, rays, scattered by the surface or interface of the non-transparent material and light rays, perturbed by inhomogeneities of the non-transparent material, from entering the imaging optical path.

2. The optical apparatus of claim 1, further comprising:
   i. a removable block disposed within the imaging optical path optically downstream of the infinity corrected objective; and
   ii. an adjustable iris disposed within the imaging optical path optically downstream of the infinity corrected objective,
   wherein the relay optics, the infinity corrected objective, the removable block and the adjustable iris are arranged to at least partially prevent light rays directly reflected by the surface or interface of the non-transparent material of the object from reaching the sensor or forming the image within a sensor plane.

3. The optical apparatus of claim 1, wherein the relay optics is configured to perform spatial modulation of intensity of the illuminating light.

4. The optical apparatus of claim 1, further comprising dephasing optics comprising a ½ wave plate; a non-polarization maintaining optical element and a polarizing beam splitter, the dephasing optics operable to decouple polarization of the illuminating light to suppress or reduce speckle pattern.

5. The optical apparatus of claim 1, further comprising homogenizing optics operable to homogenize distribution of intensity of the illuminating light.

6. The optical apparatus of claim 5, further comprising an illumination controller operable to vary an emitting aperture of the optical fiber and the distance between the optical fiber or guide and relay optics.

7. The optical apparatus of claim 5, further comprising an imaging optics controller configured to control the size of the adjustable iris vignetting output and the position of the removable block.

8. The optical apparatus of claim 1, further comprising a second illuminating light source and a switch operable to selectively couple the illuminating light source and the second illuminating light source to the relay optics.

9. The optical apparatus of claim 1, wherein the illuminating light source further comprises an optical fiber or guide operable to deliver the illuminating light to the relay optics and wherein the angular spectrum of the illuminating light is controlled by choosing a numerical aperture of the optical fiber or guide and using an adjustable iris vignetting output of the optical fiber or guide and an adjustable distance between the optical fiber or guide and the relay optics.

10. The optical apparatus of claim 9, wherein the tilt angle is determined at least by the size of an emitting aperture of the optical fiber or guide, the distance between the optical fiber or guide and the relay optics, and the divergence of the illuminating light coupled to the relay optics.

11. The optical apparatus of claim 1, wherein the imaging optical path comprises a tube lens for creating the image of the object in the image sensor, the tube lens being disposed optically downstream of the removable block and the adjustable iris.

12. The optical apparatus of claim 11, wherein the spatial beam intensity modulator comprises a light diffuser, an optical fiber or guide disposed within the illumination optical path and operable to homogenize spatial and angular distribution of the intensity of the illuminating light.

13. The optical apparatus of claim 12, further comprising a switch configured to alternatively couple the monochromatic illuminating light source and the white illuminating light source to the illumination optical path.

14. The optical apparatus of claim 1, further comprising filtering optics, wherein the illuminating light source, the infinity corrected objective, the filtering optics, and the relay optics are arranged to provide a predetermined angle of incidence of the illuminating light on the object, wherein the predetermined angle of incidence is selected such as to prevent the stray light and prevent or reduce an amount of light scattered from a surface or an interface of the non-transparent material from entering the imaging optical path, and to create conditions for prevention or reduction of an amount of light directly reflected by the surface or the interface of the non-transparent material from reaching the image sensor or prevention of the directly reflected light from forming the image within the image sensor plane.

15. The optical apparatus of claim 1, further comprising a spatial beam intensity modulator disposed within the relay optics for conditioning the illuminating light.

16. The optical apparatus of claim 1, further comprising an optical fiber or light guide having an adjustable iris vignetting output of the fiber and operable to control a divergence and a size of an emitting area and an angular spectrum distribution of the illuminating light.

17. The optical apparatus of claim 1, wherein the illuminating light source is a monochromatic light source producing substantially monochromatic illuminating light and wherein the optical apparatus further comprises a color inspection subsystem comprising a white illuminating light source producing a white illuminating light and a switching module, wherein the switching module, the imaging optical path and the image sensor are configured to create images of the object illuminated alternatively by the monochromatic light and the white light.

18. The optical apparatus of claim 1, wherein a wavelength of the illuminating light is selected based on optical properties of the non-transparent material covering a structure of interest on the object.

19. The optical apparatus of claim 1, wherein each point on a light-emitting surface of the illuminating light source emits light in a substantially one direction or narrow solid angle around that direction.

20. The optical apparatus of claim 1, further comprising a set of infinity corrected objective lenses and a switching module, wherein the switching module is operable to selectively place the required infinity corrected objective lens into the imaging optical path and wherein the infinity corrected objective lenses are characterized by different magnifications and design to work in different spectral ranges.

21. The optical apparatus of claim 1, further comprising multiple illuminating light sources, an illumination controller operable to control parameters of the multiple illuminating sources, the parameters comprising at least one of: intensity of emission, time domain duty cycle, synchronization mode or triggering mode.

22. The optical apparatus of claim 1, wherein the illuminating light source comprises at least one of a laser or an LED.

23. The optical apparatus of claim 1, wherein the illuminating light source comprises a diode pumped solid state laser operating in nanosecond mode, the illuminating light source being configured to additionally perform material processing.

24. The optical apparatus of claim 1, wherein the image sensor comprises a CCD imaging sensor.

25. The optical apparatus of claim 1, wherein the illuminating light produced by the illuminating light source is characterized by a wavelength at which a material of at least a portion of the object is not transparent.

26. An optical apparatus for creating an image of an object comprising an object feature, the apparatus comprising:
   a. an illuminating light source having an emitting aperture and producing an illuminating light having a controlled angular spectrum;

b. an infinity corrected objective directing the illuminating light on the object and collecting light from the object;
c. an illumination optical path delivering the illuminating light from the illuminating light source to the infinity-corrected objective;
d. a relay optics disposed within the illumination optical path for introducing a predetermined tilt angle for rays of the illuminating light entering the infinity corrected objective;
e. an image sensor for creating the image of the object; and
f. an imaging optical path for delivering the collected light from the infinity-corrected objective to the image sensor,
wherein the emitting aperture of the illuminating light source is configured to completely fill the entrance pupil of the infinity corrected objective and the relay optics is configured to provide focusing of the illuminating light on the surface of the object or building an image of the illuminating light source at an object plane.

27. The optical apparatus of claim 26, wherein the illuminating light source further comprises an optical fiber or guide operable to deliver the illuminating light to the relay optics and wherein the angular spectrum of the illuminating light is controlled by choosing a numerical aperture of the optical fiber or guide and using an adjustable iris vignetting output of the optical fiber or guide and an adjustable distance between the optical fiber or guide and the relay optics and wherein the adjustable iris vignetting output of the optical fiber or guide is opened and the adjustable distance between the optical fiber or guide and the relay optics is set to achieve focusing of the illuminating light on the object or building the image of the illuminating light source at the object plane.

28. An optical apparatus for creating an image of an object comprising an object feature, the apparatus comprising:
a. an illuminating light source having an emitting aperture and producing an illuminating light having a controlled angular spectrum;
b. an infinity corrected objective directing the illuminating light on the object and collecting light from the object;
c. an illumination optical path delivering the illuminating light from the illuminating light source to the infinity-corrected objective;
d. a relay optics disposed within the illumination optical path for introducing a predetermined tilt angle for rays of the illuminating light entering the infinity corrected objective;
e. an image sensor for creating the image of the object; and
f. an imaging optical path for delivering the collected light from the infinity-corrected objective to the image sensor,
wherein the emitting aperture of the illuminating light source is substantially reduced and the relay optics is configured to provide a strongly divergent or a strongly convergent illuminating light incident on the object.

29. A method for creating an image of an object comprising non-transparent material, the method comprising:
a. producing, using an illuminating light source, an illuminating light having a controlled angular spectrum;
b. directing, using an infinity corrected objective, the illuminating light on the object and collecting light from the object;
c. delivering, using an illumination optical path, the illuminating light from the illuminating light source to the infinity-corrected objective;
d. introducing, using a relay optics disposed within the illumination optical path, a predetermined tilt angle for rays of the illuminating light entering the infinity corrected objective;
e. creating, using an image sensor, the image of the object; and
f. delivering, using an imaging optical path, the collected light from the infinity-corrected objective to the image sensor,
wherein the illuminating light source, the infinity corrected objective and the relay optics are used to at least partially prevent stray light rays, rays, scattered by the surface or interface of the non-transparent material and light rays, perturbed by inhomogeneities of the non-transparent material, from entering the imaging optical path.

30. A method for creating an image of an object comprising an object feature, the method comprising:
a. producing, using an illuminating light source having an emitting aperture, an illuminating light having a controlled angular spectrum;
b. directing, using an infinity corrected objective, the illuminating light on the object and collecting light from the object;
c. delivering, using an illumination optical path, the illuminating light from the illuminating light source to the infinity-corrected objective;
d. introducing, using a relay optics disposed within the illumination optical path, a predetermined tilt angle for rays of the illuminating light entering the infinity corrected objective;
e. creating, using an image sensor, the image of the object; and
f. delivering, using an imaging optical path, the collected light from the infinity-corrected objective to the image sensor,
wherein the emitting aperture of the illuminating light source is used to completely fill the entrance pupil of the infinity corrected objective and the relay optics is used to provide focusing of the illuminating light on the surface of the object or building an image of the illuminating light source at an object plane.

31. A method for creating an image of an object comprising an object feature, the method comprising:
a. producing, using an illuminating light source having an emitting aperture, an illuminating light having a controlled angular spectrum;
b. directing, using an infinity corrected objective, the illuminating light on the object and collecting light from the object;
c. delivering, using an illumination optical path, the illuminating light from the illuminating light source to the infinity-corrected objective;
d. introducing, using a relay optics disposed within the illumination optical path, a predetermined tilt angle for rays of the illuminating light entering the infinity corrected objective;
e. creating, using an image sensor, the image of the object; and
f. delivering, using an imaging optical path, the collected light from the infinity-corrected objective to the image sensor,
wherein the emitting aperture of the illuminating light source is substantially reduced and the relay optics is used to provide a strongly divergent or a strongly convergent illuminating light incident on the object.

* * * * *